United States Patent Office 3,369,008
Patented Feb. 13, 1968

3,369,008
N-(CYCLIC UREIDOALKYL)CROTONAMIDES AND POLYMERS THEREOF
Melvin D. Hurwitz, Southampton, Pa., assignor to Rohm & Haas Company, Philadelphia, Pa., a corporation of Delaware
No Drawing. Filed May 26, 1964, Ser. No. 370,364
11 Claims. (Cl. 260—80.72)

This invention is concerned with N-(cyclic ureidoalkyl)crotonamides and polymers thereof. The monomers of the present invention are those of the formula

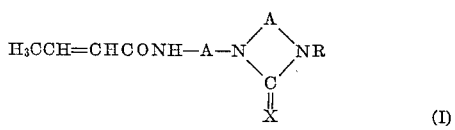

(I)

wherein A is an alkylene group having 2 to 3 carbon atoms, such as ethylene (—$CH_2CH_2$—), propylene (—$CH(CH_3)CH_2$), and trimethylene (—$CH_2CH_2CH_2$—)

R is selected from the group consisting of H, —$CH_2OH$, and —$CH_2OR'$ in which R' is an alkyl group having 1 to 4 carbon atoms, and X is selected from the group consisting of O and S.

The two A substituents need not be identical.

The polymers and copolymers of a compound of Formula I are useful in coating compositions and textile finishing compositions, as adhesives, as paper treating agents, and as additives for viscose dopes and cellulose acetate dopes to improve the properties of fibers and films formed therefrom.

Various methods of preparation may be used to form the monomers. They are generally most advantageously prepared by reacting a crotonic halide, such as the chloride or bromide, with an N-aminoalkyl-N,N'-alkyleneurea or -thiourea of the formula

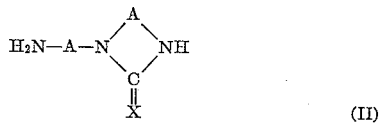

(II)

where A and X have the meanings stated above. Typical compounds are 1-(2-aminoethyl)-2-imidazolidone, 1-(2-aminoethyl)-2-imidazolidinethione, 1-(2-aminopropyl)-4 (or 5)-methyl-2-imidazolidone, 1-(3-aminopropyl)-hexahydro - 2-pyrimidone, 1-(3-aminopropyl)-hexahydro-2-thiopyrimidone, etc.

The reaction is best carried out in an inert organic solvent and in the presence of an acceptor for hydrogen halide. Temperatures between —20° and about 50° C. are generally used.

Excess of the amine reactant can be used as an acceptor for hydrogen halide, which is formed in the reaction. Where the resulting amine hydrohalide is insoluble in the solvent used, it can be removed by filtering. Instead of using an excess of this reactant, however, there may be used other basic materials including alkali metal bases and tertiary amines, such as sodium hydroxide, sodium bicarbonate, potassium carbonate, pyridine, triethylamine, etc.

As solvent, there may be used one or more inert organic solvents, such as carbon tetrachloride, chloroform, ethylene dichloride, acetonitrile, dimethylformamide, ethyl ether, isopropyl ether, and the like.

After removal of the hydrogen halide as an amine hydrohalide or alkali metal salt, the reaction mixture is worked up in any convenient way. Some of the amides formed may be extracted with water from the solvent system. Again, the organic solvent may be stripped off to yield an oil or a solid, which is the desired amide. Where solids are obtained, they can be purified by recrystallization.

Another method of preparation is by reaction of crotonic acid or of its esters such as methyl, ethyl, or butyl crotonate with an amine of Formula II supra. The acid or ester and the amine are reacted by heating a mixture thereof dissolved in an organic solvent, such as an alcohol, at a temperature of 50° C. to 150° C. Excess of the amines can be relied on as a catalyst but an alkali metal alkoxide or a quaternary ammonium hydroxide may be used to accelerate the reaction.

The compounds of Formula I are either high-boiling liquids or solid crystalline materials generally white or colorless when pure, and they are generally soluble in alcohols, especially methanol, ethanol, and isopropanol, in dimethylformamide, ethyl acetate, acetonitrile, dimethylacetamide, and acetone.

The compounds of Formula I may be introduced into all sorts of formed structures, such as fibers, films, sheets, rods and other shaped structures, formed of various vinyl resins, such as copolymers of vinyl chloride with acrylonitrile or vinyl acetate, homopolymers of vinyl chloride, vinylidene chloride, or acrylonitrile, copolymers of vinylidene chloride with acrylonitrile or vinyl acetate or vinyl chloride, copolymers of acrylonitrile with vinyl acetate, vinyl pyridines, ethylene, isobutylene, and so on, by introducing from 2% to 10% by weight, on the weight of the film-forming polymer, in the melt, solution, or dispersion of the latter before its extrusion, casting, or molding into the final shaped product. The incorporation of the compounds of Formula I in this manner into formed vinyl resin structures serves various purposes including modification of the dyeing, which is particularly important in the production of fibrous materials from polymers of acrylonitrile containing 75% to 95% of the acrylonitrile with other comonomers. Another important purpose served by the introduction of the new compounds into various formed articles made from vinyl resins and especially the polymers of acrylonitrile just mentioned is the increase in moisture retention or moisture regain of the structures and also the reduction of the tendency to develop static electricity during spinning operations as in carding, drawing and twisting, weaving and knitting, and so on. The compounds of Formula I may also be included with glycerine or glycols to provide softening compositions for products, and especially pellicles, films, or sheets formed of regenerated cellulose and hydroxyethyl cellulose to enhance the slip characteristics of the sheets and to reduce blocking tendencies thereof.

The compounds of Formula I are also useful as modifiers in aminoplast resin-forming condensates generally, especially those of urea-formaldehyde and melamine-formaldehyde. In such case, a small amount of a free radical initiator of the types described hereinafter may be included to provide addition polymerization before, during, or after the thermosetting condensation reaction. In this connection, the new compounds may take part in the thermosetting reaction by virtue of the reactivity of the hydrogen on the nitrogen with formaldehyde or with formaldehyde in conjunction with a lower alcohol from methyl through butyl that may be present in the aminoplast composition or by virtue of the methylol or alkoxymethyl groups in the R position.

The compounds of Formula I may be polymerized or copolymerized in bulk, in solution, or by either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although the compounds of Formula I have generally an appreciable solubility in water, these compounds may be copolymerized with water-insoluble monomers by an emulsion technique in which the comonomers and any excess of the compound of Formula I over the amount that is soluble in the water are emulsified by non-ionic, cationic, or anionic emulsifiers or suitable mixtures thereof.

While other polymerizable amides containing cyclic ureido groups on the amide nitrogen are known, as in U.S. Patents 2,727,016 and 2,831,833, the monomeric compounds of the present invention have a distinct advantage over the compounds of the patents just cited in the greater stability of their ethylenic double bond in the presence of compounds having reactive hydrogen atoms. For instance, the monomers of the present invention can be addition copolymerized with reactive comonomers, such as aminoethyl vinyl ethers or vinyl sulfide whereas the monomers of the aforesaid patents tend to add such compounds across the double bond by the Michael reaction mechanism before they can polymerize by addition. The monomers of the present invention accordingly have greater versatility in the production of vinyl-type addition copolymers.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis(1,3 - dimethylvaleronitrile), azobis(α-methylbutyronitrile), azobis(α-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxide catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension of slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridium chloride, (octylbenzyl)-trimethylammonium chloride, and so on.

Examples of vinylidene or monoethylenically unsaturated compounds having a terminal

group that may be copolymerized with the compound of Formula I include vinyl esters, especially vinyl acetate, propionate, butyrate, laurate, oleate, and stearate, vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene, vinyltoluene, vinyl-carbazole, and allyl esters of monocarboxylic acids. Specific additional vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, α-methylstyrene, p-methylstyrene, p-chlorostyrene, vinylnapthalane, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

Especially useful copolymers include those containing at least 15% by weight of vinyl acetate and about ½ to 10% by weight of a monomer of Formula I. Preferred polymers in this group are those containing at least 50% of vinyl acetate, and ½ to 10% (better yet 1 to 5%) of a monomer of Formula I, any balance of the polymer being formed of at least one monomer of monoethylenically unsaturated type having a terminal

such as an ester of acrylic acid or methacrylic acid, styrene, vinyltoluene, acrylonitrile or acrylamide.

Besides forming the polymers by direct polymerization or copolymerization of appropriate monomers including a monomer of Formula I, polymers of the present invention can be advantageously prepared by first forming a polymer of crotonic acid or an ester of crotonic acid such as methyl or ethyl crotonate and subsequently aminolyzing the resulting polymer with an amine of Formula II. For example, in preparing copolymers, there may be first prepared a copolymer of about ½ to 10% or more by weight of methyl crotonate with other monomers such as vinyl acetate or mixtures of vinyl acetate with acrylic esters, nitriles, amides of acrylic or methacrylic acid, or vinyl aromatic compounds such as styrene or vinyltoluene. These copolymers may be made in conventional fashion. The resulting polymers preferably in the form of solutions in inert organic solvents are then aminolyzed by the addition of an amine of Formula II, the amount of the latter being used such as to provide a weight equivalent to the amount of crotonic ester to be aminolyzed in the polymer.

The amine itself provides sufficient alkalinity to promote the reaction. If desired, an excess of the amine of Formula I may be incorporated to hasten the reaction. On the other hand, an alkali metal alkoxide such as sodium methoxide or a quaternary ammonium hydroxide or alkoxide such as trimethylbenzyl ammonium, dimethyldibenzyl ammonium, or trimethylhydroxyethyl ammonium hydroxide or trimethylbenzyl ammonium butoxide may be used as catalysts. Alkali metal dispersions also act as catalysts. An amount of 0.25% to 10% of catalyst on the weight of the polymer is suitable. The catalyst is desirably used in an organic solvent which is inert to the catalyst. For example, sodium methylate is conveniently used as a 10% to 25% solution in methanol. The solvent thus added can also be used for refluxing when the mixture is heated.

Aminolysis is conducted at temperatures between 65° and 150° C., best from 75° to 130° C. Heating is continued until a product of desired properties is reached. The extent of aminolysis can be followed through consumption of amino groups as shown by titration.

The homopolymers of compounds of Formula I (except for the larger alkoxy-substituted types, e.g. N-butoxymethyl) are generally water-soluble. They are useful as sizes for paper, textiles and particularly as warp sizes. When introduced into paper pulps, they provide increased wet strength in the final dry paper containing them. For this purpose, there may be used from about 1% to 7% of a polymer of one of the compounds of Formula I on the dry fiber weight of the paper. They are useful as thickeners for various aqueous coating, adhesive, and film-forming compositions. The homopolymers are also useful as flocculants, especially useful in higher molecular weights of at least 20,000 to 50,000 to aid in the clarification of aqueous systems containing clays, or other finely divided materials, especially mineral matter as is produced in the grinding of ores. In this connection, they not only increase the settling rate but generally increase the rate of filtration. The homopolymers may be used in admixture with other materials, such as starch, gelatin, or plasticizers therefor to provide coatings or films, thickening materials, warp sizes or the like. The homopolymers mixed with other film-forming materials, such as vinyl and acrylic resins, may be pigmented or dyed to provide decorative coatings on substrates, such as textile, leather, paper, wood or on metal or glass surfaces. The homopolymers in which R is H are reactive with formaldehyde and the reaction product thereby obtained is also useful as an additive to paper pulps to provide increased wet strength in the final paper. The homopolymers, or their reaction product with formaldehyde, may be combined with aminoplast resin-forming condensation products, such as those of ureaformaldehyde or triazineformaldehyde condensates including melamine-formaldehyde. The inclusion of the homopolymers of the present invention serves to increase the toughness of the product and the water-resistance thereof when used in amounts of about 5% to 15%, based on the weight of the aminoplast condensate.

Copolymers containing a large proportion of one or more of the compounds of Formula I have similar utilities to the extent that they are water-soluble as warp sizes, wet strength resins in paper, thickeners, and flocculants. However, copolymers containing from 0.5% to 20% by weight or more of the compounds of Formula I with various comonomers are adapted to provide valuable coating materials in organic solvent type lacquers or enamels which may be pigmented or not and, in the case of emulsion copolymers, they are adapted to provide valuable water-base paints. Copolymers containing from 3% to 20% by weight of a compound of Formula I with ethyl acrylate, butyl acrylate, or the like are useful to reduce the shrinkage of wool or for the bonding of fibers in "non-woven" fabrics. For these purposes they may be applied in aqueous dispersions of a concentration from 10% to 50% so that from about 5% to 15% by weight of the copolymer is deposited on the wool fabric or as much as 40% to 200% on the weight of fiber in non-woven fabrics. After drying, the treated fabric may be heated to 240° F. to 350° F. from a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. Copolymers with acrylonitrile, especially those containing from 75% to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75% to 90% acrylonitrile, such as copolymers thereof with vinyl chloride, vinyl acetate or the like, serve to modify the dyeing properties of fibers and films formed therefrom.

The presence of a monomer of Formula I in water-insoluble copolymers containing from 0.5 to 10% by weight of such monomer in polymerized form has been found to enhance the adhesion of the coatings deposited either from organic solvent solutions or dispersions or aqueous dispersions of the copolymers to many substrates, such as paper, textiles, leather, wood, bare metals, such as steel, aluminum, and copper, and metals primed with commercially available alkyd, aminoplast, or epoxy-containing primers. The monomers in which X is oxygen and R is H or methylol are especially valuable in this connection.

In the following examples, which are illustrative of the present nivention, parts are by weight and temperatures are ° C. unless otherwise noted.

*Example 1*

A solution of 542 g. (0.42 mole) of N-(β-aminoethyl)-N,N'-ethyleneurea in 125 ml. of methylene chloride is cooled to 5° and with stirring 20 g. (0.2 mole) of crotonic chloride in 75 ml. of methylene chloride is added. Following this, 24 g. (0.22 mole) of crotonic chloride in 75 ml. of methylene chloride and 62 g. (0.45 mole) of potassium carbonate in 150 ml. of water are added simultaneously. Throughout the addition the temperature is held below 10°. After addition, the reaction mixture is stirred for 30 minutes as the temperature increases to 20°. The reaction mixture is filtered and the lower methylene chloride layer is dried wih magnesium sulfate. Removal of the methylene chloride and crystallization of the crude product from benzene affords 50 g. (60%) of N-(β-(N',N''-ethyleneureido)ethyl)-crotonamide, M.P. 130–132°.

*Analysis.*—Calcd. for $C_9H_{15}N_3O_2$: C, 54.80%; H, 7.67%; N, 21.31%. Found: C, 54.74%; H, 7.55%; N, 21.31%.

*Example 2*

To produce N - (β - (N',N''-ethylenethioureido)ethyl) crotonamide, the process of Example 1 may be repeated except that the amine is replaced by 61 g. (0.42 mole) of N-(β-aminoethyl)-N,N'-ethylenethiourea.

*Example 3*

Example 1 may be repeated replacing the amine with 66 g. (0.42 mole) of N-(β - aminopropyl)-N,N'-propylenethiourea to produce N - (β - (N',N'' - propylenethioureido)propyl)crotonamide.

*Example 4*

Example 1 may be repeated replacing the amine with 66 g. (0.42 mole) of N-(3-aminopropyl)-N,N'-trimethyleneurea to produce N-[3-(N',N''-trimethyleneureido) propyl]crotonamide.

Example 5

To 129 g. (1.0 mole) of N-(β-aminoethyl)-N,N'-ethyleneurea, 200 g. (20 mole) of methyl crotonate is added. The mixture is refluxed, and a methanol/methyl crotonate azeotrope is slowly distilled through a 20 cm. Vigreaux column. When the distillation temperature reaches about 120° C., the boiling point of methyl crotonate, the residual methyl crotonate and amine are removed under reduced pressure. The pot residue, 141 g., is crude N-[β-(N',N''-ethyleneureido)ethyl]crotonamide.

Example 6

To 129 g. (1.0 mole) of N-(β-aminoethyl)-N,N'-ethyleneurea 86 g. (1.0 mole) of crotonic acid is added slowly with stirring. The thick paste that results is heated under a flow of nitrogen at 150° C. overnight. The unreacted crotonic acid and amine are removed at reduced pressure, and the residue of N-[β-(N',N''-ethyleneureido)ethyl] crotonamide is recrystallized from benzene. Yield, 22%.

Example 7

(a) *Methylol derivative of β-ethyleneureidoethyl crotonamide.*—To N - [β-(N',N''-ethyleneureido)ethyl]-crotonamide (197 g.; 1 mole) there are added 1 g. anhydrous potassium carbonate and 33 g. (about 1 mole) of 92% flake paraformaldehyde. The mixture is heated to 70° C. and held at 70° C. for about six hours with stirring. About 84% of the formaldehyde combines to yield methylol groups on the nitrogen of the cyclic ureido group. The melt is poured into a pan whereupon it sets to a glassy solid.

(b) *Methoxymethyl derivative of N-[β-(N',N''-ethyleneureido)ethyl]-crotonamide.*—A crude methylol derivative is made as described in part (a) hereof and is made into a 25% by weight solution in anhydrous methanol. Enough hydrogen chloride as a methanol solution is added to lower the pH to about 3.0, and the solution is refluxed for about six hours to convert about 80% of the crude N-methylol derivative to the N-methoxymethyl compound. The pH is then adjusted to 7.0 with anhydrous potassium carbonate and the solution is filtered to remove inorganic salts.

Example 8

(a) A monomer mixture comprising 50 g. ethyl acrylate, 50 g. methyl methacrylate, 2.0 g. N-[β-(N',N''-ethyleneureido)-ethyl]-crotonamide and 0.75 g. benzoyl peroxide is added over a period of three hours to 150 g. of refluxing toluene containing 0.5% of di-tert-butyl peroxide. Two hours after completion of monomer addition, 0.25 g. of benzoyl peroxide is added, and refluxing is continued for three more hours. Polymerization is essentially complete.

(b) The polymer solution obtained in part (a) is coated on a cold-rolled steel panel at an initial thickness of 10 mils. A control coating of a similar solution polymer not comprising the crotonamide is also applied to a separate cold-rolled steel panel at the same thickness. After allowing the coated panels to air-dry for an hour, both films are baked at 150° C. for 30 minutes. On scratching with a knife, the polymer comprising the crotonamide exhibits excellent adhesion while a coating of the control polymer is readily removed.

Example 9

(a) To a one-liter round bottom flask equipped with a 4-bladed, propeller-type agitator, there are added the following ingredients, with the agitator rotating at approximately 470 r.p.m.:

| | |
|---|---|
| Deionized water ml | 376 |
| Sodium tert-octylphenoxydiethoxyethyl sulfonate (28% aqueous solution) g | 24 |
| Ethyl acrylate, inhibitor free g | 97.5 |
| Methyl methacrylate, inhibitor free g | 97.5 |
| N - [β - (N',N'' - ethyleneureido)ethyl] - crotonamide g | 5.0 |
| Solution of 0.3 g. ferrous sulfate (FeSO$_4$·7H$_2$O) in 200 ml. of water, representing 6 p.p.m. of iron in the emulsion ml | 4 |
| Ammonium persulfate g | 1 |

The temperature is adjusted to 20° C., and 1 g. of sodium metabisulfite and 5 drops of sec-butyl hydroperoxide (70%) are added. No induction period occurs, and the temperature rises to 89° C. within 2–3 minutes. Most of the reaction occurs within a few minutes and is practically complete 15 minutes after the start of the reaction.

(b) Wood panels of white pine are coated with the emulsion copolymer dispersion obtained in part (a) by brushing the dispersion on the panels.

(c) Other panels of white pine are brushed on their surfaces with a pigmented primer formed of the copolymer dispersion of part (a) and having the following formulation:

| | Parts |
|---|---|
| Ammonium salt of maleic anhydride/diisobutylene copolymer | 0.4 |
| Rutile titanium dioxide | 28.3 |
| Water ground mica | 71.7 |
| Hydroxyethyl cellulose (2%) | 71.7 |
| Ethylene glycol | 1.4 |
| Copolymer dispersion of part (a) (33.6% solids) | 723.0 |
| Preservative | 4.3 |
| Anti-foamer | 2.8 |

(d) The primed panels of parts (b) and (c) are dried and are then coated with two coats of a water-base acrylic polymer exterior paint. The same water-base acrylic emulsion exterior paint is applied in two coats over unprimed white pine panels. After drying in air, the coated boards obtained from the primed panels show less staining and cracking, and better adhesion.

(e) The clear emulsion polymer of part (a) and the pigmented emulsion polymer formulation of part (c) are applied to sanded panels of various woods including yellow pine, oak, maple, cypress and Douglas fir. They are also applied to surfaces of such woods as those just named which had previously been painted with an oil-base paint which had partially been removed by weathering. The application to the latter panels is made after sanding off the loose portions of the old paint layers. The coatings adhere well, exhibit little or no stain, are free of blisters, and show no evidence of cracking. Similar results are obtained when the coated panels are given two or three coats of the same polymer compositions and also when the panels carrying a single coat of the clear and pigmented compositions just mentioned are further coated with one and two additional coats of a commercially available acrylic emulsion polymer water-base paint.

Example 10

(a) The same procedure is used as in Example 9(a) except the monomer charge is as follows:

| | Grams |
|---|---|
| Vinyl acetate | 120 |
| Ethyl acrylate | 60 |
| N-[β-(N',N'' - propylenethioureido)propyl]-crotonamide | 20 |

The properties of the product are:

| | |
|---|---|
| pH at 26° C. | About 2.6 |
| Viscosity, cps. | 10.1 |
| MFT, ° C. | About 12 |
| Solids, percent | About 33.1 |

(b) Parts (b) through (c) of Example 9 are repeated using the aqueous dispersion of part (a) hereof in place of that of part (a) in Example 9. Similar results are obtained.

Example 11

A mixture of 20 grams butyl acrylate, 10 grams styrene, 63 grams acrylonitrile, 5 g. of the N-methylol derivative of N-[β-(N',N''-ethyleneureido)ethyl]-crotonamide of Example 7(a) and 2 grams of methocrylic acid may be copolymerized by the procedure of Example 8(a).

A copper wire may be coated with the resulting polymer solution, dried, and cured to insoluble condition at 150° C. for 10 minutes. The coating has excellent adhesion and durability as well as good electrical insulating qualities.

Example 12

An aqueous dispersion of an emulsion copolymer of 80% ethyl acrylate, 15% vinyl acetate, and 5% of N-[β-(N',N''-ethyleneureido)ethyl]-crotonamide may be prepared as in Example 9(a) except that the emulsifier is replaced by 15 g. of a 50% sodium lauryl sulfate solution. To 100 g. of the resulting (approximately 35% solids) dispersion in a closed pressure vessel there are added 1 g. of sodium hydroxide and 25 g. of 37% formaldehyde and the mixture is heated for half an hour at 50° C.

A carded viscose web weighing 2 ozs. per square yard may be padded through the resulting methylolated copolymer dispersion under conditions providing a 100% wet pickup. The impregnated web may be dried a few minutes in ambient air and then heated to 150° C. for five minutes.

Example 13

*Aminolysis of copolymers and styrene and methyl crotonate.*—Styrene (50 g.) and methyl crotonate (10 g.) are mixed with 500 ml. of toluene and 0.6 g. of α,α'-azodiisobutyronitrile is added to the mixture. The temperature is raised to 100° C. and the mixture stirred. After 24 hours the solution is viscous and the polymerization essentially complete.

To the polymer solution 6.45 g. of N-aminoethyl-N,N'-ethyleneurea is added, and the solution refluxed for another 24 hours to reduce the amine functionality, as determinable by an acid-base titration, to a mere trace and to provide a solution containing a copolymer of styrene and N-crotonamidoethyl-N,N'-ethyleneurea.

Example 14

*Terpolymer of ethyl acrylate, aminoethyl vinylsulfide and N-crotonamidoethyl-N,N'-ethyleneurea.*—Ethyl acrylate (100 g.), aminoethyl vinyl sulfide (100 g.), and N-(N',N''-ethyleneureidomethyl)crotonamide (7.5 g.) are mixed with 352.5 g. of toluene and 0.5 g. of α,α'-azodiisobutyronitrile. The mixture is stirred and heated to 80° C., for four hours. At this time 0.20 g. more of α,α'-azodiisobutyronitrile is added and heating continued for another four hours. The solution is quite viscous and copolymerization is essentially complete.

I claim:

1. A compound of the formula

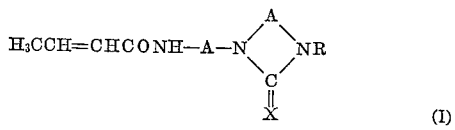

wherein
A is an alkylene group having 2 to 3 carbon atoms,
R is selected from the group consisting of H, —CH$_2$OH, and —CH$_2$OR' in which R' is an alkyl group having 1 to 4 carbon atoms, and
X is selected from the group consisting of O and S.

2. A compound of the formula

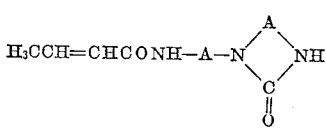

wherein
A is an alkylene group having 2 to 3 carbon atoms.

3. N-(β-crotonamidoethyl)-N,N'-ethyleneurea.
4. N-(β-crotonamidoethyl)-N,N'-ethylenethiourea.
5. N-(β-crotonamidopropyl)-N,N'-propyleneurea.
6. N-(β-crotonamidopropyl)-N,N'-trimethyleneurea.

7. As a composition of matter, an addition polymer of a compound of the formula

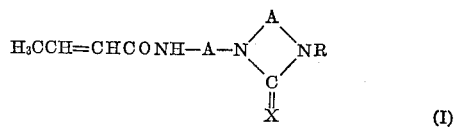

wherein
A is an alkylene group having 2 to 3 carbon atoms,
R is selected from the group consisting of H, —CH$_2$OH, and —CH$_2$OR' in which R' is an alkyl group having 1 to 4 carbon atoms, and
X is selected from the group consisting of O and S.

8. As a composition of matter, an addition copolymer of ethylenically unsaturated molecules comprising at least about 0.5% by weight of a compound of the formula

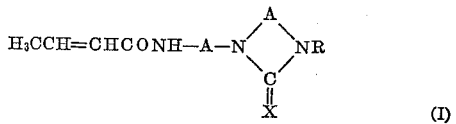

wherein
A is an alkylene group having 2 to 3 carbon atoms,
R is selected from the group consisting of H, —CH$_2$OH, and —CH$_2$OR' in which R' is an alkyl group having 1 to 4 carbon atoms, and
X is selected from the group consisting of O and S, and up to 99.5% by weight of at least one other copolymerizable monoethylenically unsaturated compound having a

group.

9. As a composition of matter, an addition copolymer of at least 0.5% by weight of a compound as defined in claim 1, and up to 99.5% by a weight of at least one copolymerizable monoethylenically unsaturated compound having a

group.

10. A composition as defined in claim 9 in which the copolymer comprises at least 15% by weight acetate.

11. As a composition of matter, an addition copolymer of at least 50% by weight of vinyl acetate and about ½ to 10% by weight of a compound as defined in claim 1, any balance needed to make 100% consisting of at least one copolymerizable monoethylenically unsaturated monomer having a

group.

References Cited

UNITED STATES PATENTS 2,727,016  12/1955  Hankins et al. _____ 260—86.1

JOSEPH L. SCHOFER, *Primary Examiner.*

H. WONG, *Assistant Examiner.*